United States Patent
Hanaki

(10) Patent No.: US 10,310,798 B2
(45) Date of Patent: Jun. 4, 2019

(54) PROGRAMMABLE DISPLAY, INFORMATION PROCESSING APPARATUS, RECORDING MEDIUM, AND SCREEN DISPLAY SYSTEM

(71) Applicant: Mitsubishi Electric Corporation, Chiyoda-ku (JP)

(72) Inventor: Yukihiro Hanaki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/750,888

(22) PCT Filed: Oct. 29, 2015

(86) PCT No.: PCT/JP2015/080629
§ 371 (c)(1),
(2) Date: Feb. 7, 2018

(87) PCT Pub. No.: WO2017/072928
PCT Pub. Date: May 4, 2017

(65) Prior Publication Data
US 2018/0225077 A1    Aug. 9, 2018

(51) Int. Cl.
*G06F 3/14*    (2006.01)
*G05B 19/05*    (2006.01)
(Continued)

(52) U.S. Cl.
CPC .......... *G06F 3/1454* (2013.01); *G05B 19/05* (2013.01); *G05B 19/41855* (2013.01);
(Continued)

(58) Field of Classification Search
CPC combination set(s) only.
See application file for complete search history.

(56) References Cited

U.S. PATENT DOCUMENTS 7,272,455 B2    9/2007    Tajika
2006/0179120 A1*    8/2006    Kegoya ............... G05B 19/042
                                                            709/217
(Continued)

FOREIGN PATENT DOCUMENTS

JP    2004-110613 A    4/2004
JP    5047401 B1    10/2012
(Continued)

OTHER PUBLICATIONS

International Search Report dated Dec. 1, 2015 in PCT/JP2015/080629 filed Oct. 29, 2015.
(Continued)

*Primary Examiner* — Koosha Sharifi-Tafreshi
(74) *Attorney, Agent, or Firm* — Oblon, McClelland, Maier & Neustadt, L.L.P.

(57) ABSTRACT

A programmable display device communicatively connected to a control apparatus that controls an apparatus in operation on a production line and to mobile terminals, includes: a storage unit to store therein screen data used for creating a screen to be displayed on the mobile terminals and a device indicating a storage location of a device value for determining an individual configuration of the screen for each of the mobile terminals; a screen creation unit to obtain the device value on the basis of the device corresponding to a connected terminal that is the mobile terminal connected to the programmable display and to create screen data for the connected terminal by using the obtained device value and the screen data; and a communication unit to transmit to the connected terminal the screen data for the connected terminal.

7 Claims, 11 Drawing Sheets

(51) Int. Cl.
*G05B 23/02* (2006.01)
*G05B 19/418* (2006.01)

(52) U.S. Cl.
CPC .... *G05B 23/02* (2013.01); *G05B 2219/15038* (2013.01); *Y02P 90/02* (2015.11)

(56) References Cited

U.S. PATENT DOCUMENTS

| | | | |
|---|---|---|---|
| 2013/0135331 A1 | 5/2013 | Koara | |
| 2013/0346842 A1* | 12/2013 | Koara | G05B 19/048 715/211 |
| 2015/0029195 A1* | 1/2015 | Ito | G06F 3/1462 345/441 |
| 2015/0379685 A1* | 12/2015 | Kobayashi | G09G 5/14 345/662 |
| 2018/0081338 A1* | 3/2018 | Takahashi | G06F 9/451 |

FOREIGN PATENT DOCUMENTS

| | | |
|---|---|---|
| JP | 2013-105301 A | 5/2013 |
| WO | 2013/080332 A1 | 6/2013 |

OTHER PUBLICATIONS

Japanese Office Action dated Jul. 3, 2017 in Japanese Application No. 2017-516809 filed Oct. 29, 2015 (with English Translation).

\* cited by examiner

FIG.3

| OBJECT | SET VALUE |
|---|---|
| OBJECT OB1 DISPLAY | 1 (DISPLAY) |
| OBJECT OB1 SIZE | 100 |
| OBJECT OB1 COLOR | 0 (BLACK) |
| OBJECT OB2 DISPLAY | 1 (DISPLAY) |
| OBJECT OB2 SIZE | 100 |
| OBJECT OB2 COLOR | 0 (BLACK) |
| OBJECT OB3 DISPLAY | 1 (DISPLAY) |
| OBJECT OB3 SIZE | 100 |
| OBJECT OB3 COLOR | 0 (BLACK) |
| ⋮ | ⋮ |

FIG.4

| TERMINAL IDENTIFIER | OBJECT | DEVICE |
|---|---|---|
| m001 | OBJECT OB1 DISPLAY | D100 |
| | OBJECT OB1 SIZE | D200 |
| | OBJECT OB1 COLOR | D300 |
| | OBJECT OB2 DISPLAY | D103 |
| | OBJECT OB2 SIZE | D204 |
| | OBJECT OB2 COLOR | D305 |
| | OBJECT OB3 DISPLAY | D106 |
| | OBJECT OB3 SIZE | D207 |
| | OBJECT OB3 COLOR | D308 |
| | ⋮ | ⋮ |
| m002 | OBJECT OB1 DISPLAY | W1F0 |
| | OBJECT OB1 SIZE | R0 |
| | OBJECT OB1 COLOR | D1000 |
| | OBJECT OB2 DISPLAY | W1F3 |
| | OBJECT OB2 SIZE | R1 |
| | OBJECT OB2 COLOR | D1001 |
| | OBJECT OB3 DISPLAY | W1F6 |
| | OBJECT OB3 SIZE | R2 |
| | OBJECT OB3 COLOR | D1002 |
| | ⋮ | ⋮ |

FIG.6

| TERMINAL IDENTIFIER | OBJECT | DEVICE | | DEVICE VALUE |
|---|---|---|---|---|
| m001 | OBJECT OB1 DISPLAY | D100 | | 1 (DISPLAY) |
| | OBJECT OB1 SIZE | D200 | | 100 |
| | OBJECT OB1 COLOR | D300 | | 224 (RED) |
| | OBJECT OB2 DISPLAY | D103 | | 1 (DISPLAY) |
| | OBJECT OB2 SIZE | D204 | ←---→ | 200 |
| | OBJECT OB2 COLOR | D305 | | 225 (WHITE) |
| | OBJECT OB3 DISPLAY | D106 | | 1 (DISPLAY) |
| | OBJECT OB3 SIZE | D207 | | 100 |
| | OBJECT OB3 COLOR | D308 | | 3 (BLUE) |
| | ⋮ | ⋮ | | |
| m002 | OBJECT OB1 DISPLAY | W1F0 | | 1 (DISPLAY) |
| | OBJECT OB1 SIZE | R0 | | 33 |
| | OBJECT OB1 COLOR | D1000 | | 0 (BLACK) |
| | OBJECT OB2 DISPLAY | W1F3 | | 1 (DISPLAY) |
| | OBJECT OB2 SIZE | R1 | ←---→ | 400 |
| | OBJECT OB2 COLOR | D1001 | | 227 (PINK) |
| | OBJECT OB3 DISPLAY | W1F6 | | 1 (DISPLAY) |
| | OBJECT OB3 SIZE | R2 | | 200 |
| | OBJECT OB3 COLOR | D1002 | | 28 (GREEN) |
| | ⋮ | ⋮ | | |

PROGRAMMABLE DISPLAY, INFORMATION PROCESSING APPARATUS, RECORDING MEDIUM, AND SCREEN DISPLAY SYSTEM

FIELD

The present application relates to a programmable display connected to a Factory Automation (FA) apparatus such as a programmable logic controller, an information processing apparatus, a recording medium, and a screen display system.

BACKGROUND

There is a conventional technology for displaying a screen in accordance with an externally-connected device on a programmable display used for an FA apparatus. The FA apparatus controls apparatuses in operation on a production line in a factory or other facilities (for example, see Patent Literature 1).

CITATION LIST

Patent Literature

Patent Literature 1: Japanese Patent No. 5047401

SUMMARY

Technical Problem

In association with the conventional technology, there is an increasing need for the programmable display to be connected to a mobile terminal so as to check the state of an apparatus connected to the FA apparatus at a location away from the programmable display. There are some methods that can meet this need. For example, screen data for the mobile terminal for displaying a screen identical to the screen displayed on the programmable display is created to be set in the mobile terminal. For another example, a dedicated program that runs on the mobile terminal is created to be installed in the mobile terminal so as to display on the mobile terminal a screen identical to the screen displayed on the programmable display. A heavier work burden is placed on a worker in both the cases where the worker creates screen data for the mobile terminal and where the worker creates a program for the mobile terminal. If the worker creates individual screen data or an individual program for each mobile terminal, this may place a considerable work burden on the worker.

The present invention has been achieved to solve the above problems, and an object of the present invention is to provide a programmable display, an information processing apparatus, a recording medium, and a screen display system that can reduce the work burden on a worker for displaying a screen corresponding to an apparatus connected to the programmable display.

Solution to Problem

In order to solve the above problems and achieve the object, an aspect of the present invention is a programmable display communicatively connected to a control apparatus that controls an apparatus in operation on a production line and to a plurality of mobile terminals. The programmable display includes a storage unit to store therein screen data used for creating a screen to be displayed on the mobile terminals and a device indicating a storage location of a device value for determining an individual configuration of the screen for each of the mobile terminals. The programmable display includes a screen creation unit to obtain the device value on the basis of the device corresponding to a connected terminal that is the mobile terminal connected to the programmable display and to create screen data for the connected terminal by using the obtained device value and the screen data. The programmable display includes a communication unit to transmit to the connected terminal the screen data for the connected terminal.

Advantageous Effects of Invention

According to the present invention, it is possible to reduce the work burden on a worker for displaying a screen corresponding to an apparatus connected to a programmable display.

BRIEF DESCRIPTION OF DRAWINGS

FIG. 3 is a diagram illustrating an example of information included in terminal screen data according to the embodiment.

FIG. 4 is a diagram illustrating an example of a screen-setting table according to the embodiment.

FIG. 6 is a diagram illustrating an example of device values corresponding to devices that have been set in the screen-setting table according to the embodiment.

DESCRIPTION OF EMBODIMENTS

Embodiment

An embodiment of the present invention will be described below in detail with reference to the accompanying drawings. The present invention is not limited to the embodiment.

Figure 1:
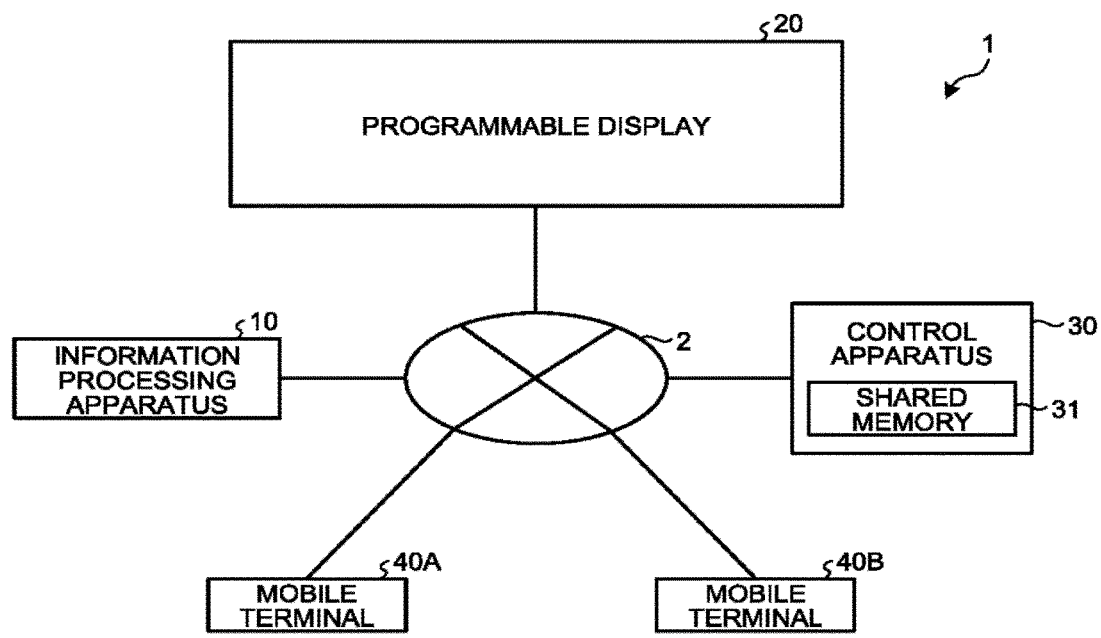
FIG. 1 is a schematic diagram illustrating a schematic configuration of a system according to an embodiment.

FIG. 1 is a schematic diagram illustrating a schematic configuration of a system 1 according to an embodiment. As illustrated in FIG. 1, the system 1 according to the present embodiment is configured to include an information processing apparatus 10, a programmable display 20, a control apparatus 30, a mobile terminal 40A, and a mobile terminal 40B. The information processing apparatus 10, the programmable display 20, the control apparatus 30, the mobile terminal 40A, and the mobile terminal 40B are communicatively connected to one another via a network 2. The network 2 may include the Internet and a Local Area Network (LAN).

The information processing apparatus 10 is, for example, a general-purpose apparatus that can execute various types of processing using a program and data. For example, the information processing apparatus 10 corresponds to a personal computer or a tablet.

The programmable display 20 displays information on an apparatus connected to the control apparatus 30. The programmable display 20 also functions as a web server that transmits information on an apparatus connected to the control apparatus 30 in response to a request from the mobile terminal 40A and the mobile terminal 40B.

The control apparatus 30 is an FA apparatus such as a Programmable Logic Controller (PLC) that controls various types of facilities and apparatuses in operation on a production line. The control apparatus 30 includes a shared memory 31. The control apparatus 30 can use a shared memory located outside the apparatus instead of including the shared memory 31 inside the apparatus.

The mobile terminal 40A and the mobile terminal 40B receive information on various types of facilities and apparatuses controlled by the control apparatus 30 from the programmable display 20, and display the information. The mobile terminal 40A and the mobile terminal 40B have a web-browser function in order to communicate with a programmable display that functions as a web server. The mobile terminal 40A and the mobile terminal 40B are general-purpose mobile apparatuses having the web-browser function and capable of displaying information. For example, the mobile terminal 40A and the mobile terminal 40B correspond to a laptop personal computer, a tablet, or a smartphone.

Figure 2:
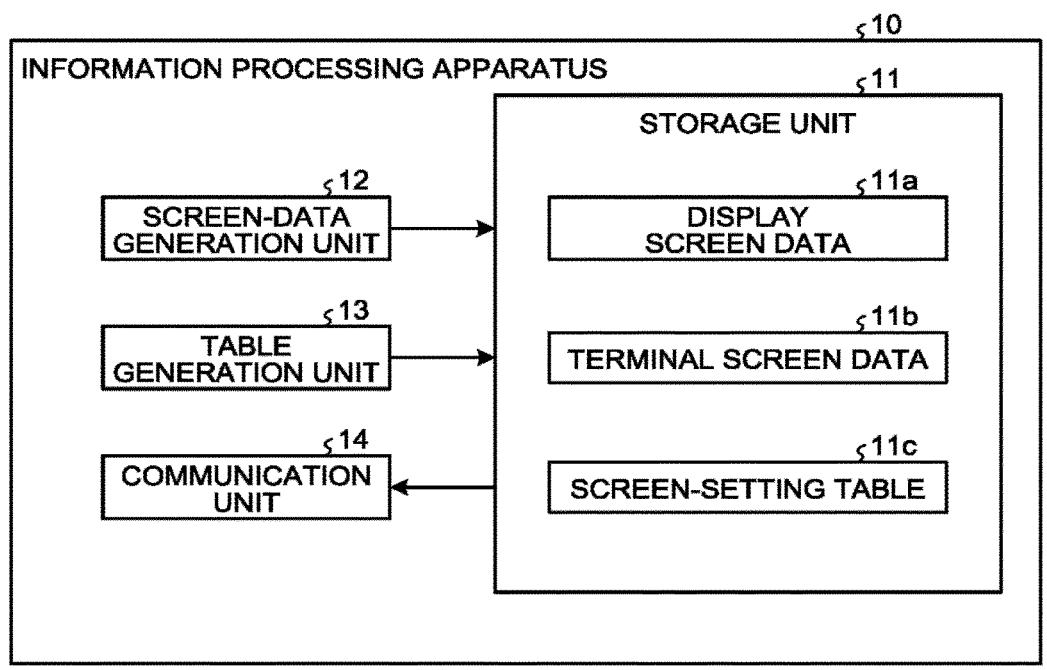
FIG. 2 is a block diagram illustrating an example of a functional configuration of an information processing apparatus according to the embodiment.

A functional configuration of the information processing apparatus 10 is described with reference to FIG. 2. FIG. 2 is a block diagram illustrating an example of the functional configuration of the information processing apparatus 10 according to the present embodiment. As illustrated in FIG. 2, the information processing apparatus 10 includes a storage unit 11 that stores therein display screen data 11a, terminal screen data 11b, and a screen-setting table 11c; a screen-data generation unit 12; a table generation unit 13; and a communication unit 14. The information processing apparatus 10 functions as an engineering tool that creates screen data for a screen to be displayed on the mobile terminal 40A and the mobile terminal 40B that are communicatively connected to the programmable display 20. As described later with reference to FIG. 11, a program for causing the information processing apparatus 10 to function as the engineering tool is installed in the information processing apparatus 10. The program for causing the information processing apparatus 10 to function as the engineering tool is installed in an executable state in the information processing apparatus 10; therefore, the screen-data generation unit 12 and the table generation unit 13 that are illustrated in FIG. 2 implement a function of creating screen data for a screen to be displayed on the mobile terminal 40A and the mobile terminal 40B.

The screen-data generation unit 12 can provide a function of generating the display screen data 11a and the terminal screen data 11b. The display screen data 11a corresponds to a screen to be displayed on the programmable display 20.

The terminal screen data 11b is used by the programmable display 20 at the time of creating a screen to be displayed on the mobile terminal 40A and the mobile terminal 40B. FIG. 3 is a diagram illustrating an example of information included in the terminal screen data 11b according to the present embodiment. The terminal screen data 11b includes all the necessary data for creating a screen to be displayed on the mobile terminal 40A and the mobile terminal 40B. For example, the terminal screen data 11b is configured from a single set of data in which the constituent elements that can be included in a screen of the mobile terminal 40A are common to all the constituent elements that can be included in a screen of the mobile terminal 40B. The constituent elements that can be included in the screen of the mobile terminal 40A and the mobile terminal 40B include a plurality of objects such as objects OB1 to OB3. The screen-data generation unit 12 has a function of setting an object configuration including a plurality of objects such as the objects OB1 to OB3, and setting a formal initial value for each individual item included in each of the objects. In the example illustrated in FIG. 3, the items included in each of the objects include "object display" that corresponds to whether an object is displayed, "object size" that indicates the size of a displayed object, and "object color" that indicates the color of a displayed object. In the example illustrated in FIG. 3, an identical initial value is set for the same items included in the objects OB1 to OB3. For example, the value "1", which indicates that an object is displayed, is set for the item "object display". The value of the display size "100" is set for the item "object size". The value "0", which indicates that an object is displayed in black, is set for the item "object color".

The table generation unit 13 can provide a function of generating a table including a device, which indicates a storage location of a device value for determining an individual configuration of a screen to be displayed on each of the mobile terminal 40A and the mobile terminal 40B. The device corresponds to an address in the shared memory 31 where the corresponding device value is stored. FIG. 4 is a diagram illustrating an example of the screen-setting table 11c according to the present embodiment. The screen-setting table 11c includes parameters for each terminal identifier to determine the configuration of a screen to be displayed on the mobile terminal 40A and the mobile terminal 40B. In the example illustrated in FIG. 4, "m001" is assigned to the mobile terminal 40A as the terminal identifier, while "m002" is assigned to the mobile terminal 40B as the terminal identifier. The parameters to determine the configuration of a screen to be displayed on the mobile terminal 40A and the mobile terminal 40B are made up of individual items such as "object display", "object size", and "object color", and devices associated with the individual items. The table generation unit 13 has a function of enabling a device to be set for each of the individual items including "object display", "object size", and "object color" for each terminal identifier.

In the example illustrated in FIG. 4, the device "D100" is associated with the item "object OB1 display" of the terminal identifier "m001", the device "D200" is associated with the item "object OB1 size" of the terminal identifier "m001", and the device "D300" is associated with the item "object OB1 color" of the terminal identifier "m001". Furthermore, the device "W1F0" is associated with the item "object OB1 display" of the terminal identifier "m002", the device "R0" is associated with the item "object OB1 size" of the terminal identifier "m002", and the device "D1000" is associated with the item "object OB1 color" of the terminal identifier "m002".

The communication unit 14 transmits the display screen data 11a, the terminal screen data 11b, and the screen-setting table 11c stored in the storage unit 11 to the programmable display 20.

Figure 5:
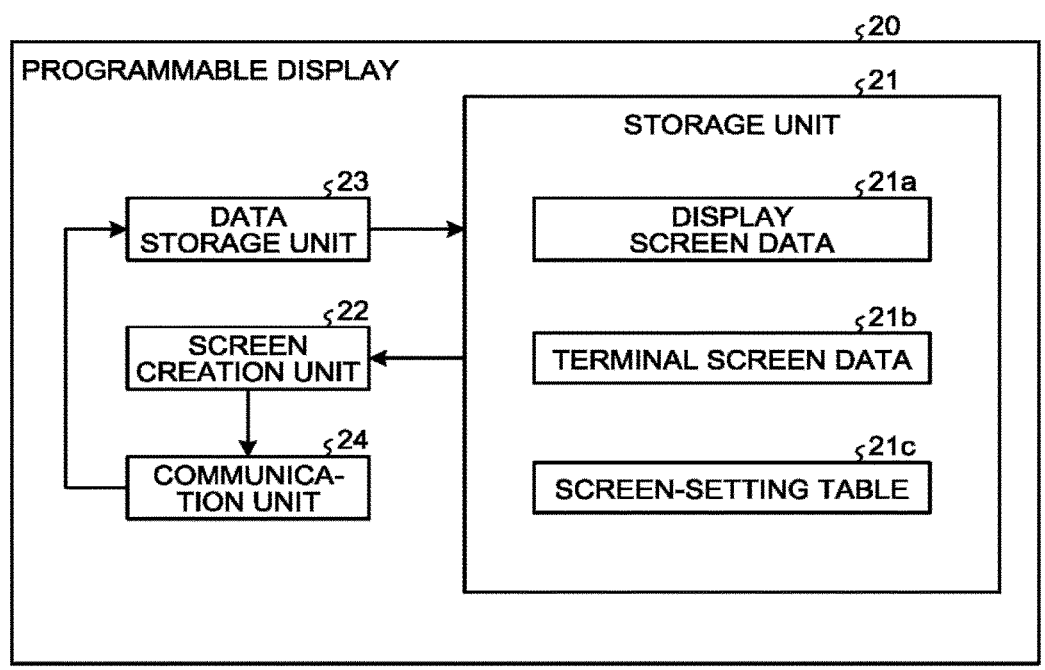
FIG. 5 is a block diagram illustrating an example of a functional configuration of a programmable display according to the embodiment.

FIG. 5 is a block diagram illustrating an example of a functional configuration of the programmable display 20 according to the present embodiment. As illustrated in FIG. 5, the programmable display 20 includes a storage unit 21 that stores therein display screen data 21a, terminal screen data 21b, and a screen-setting table 21c; a screen creation unit 22; a data storage unit 23 that stores data received from the information processing apparatus 10 in the storage unit 21; and a communication unit 24.

The display screen data 21a stored in the storage unit 21 corresponds to the display screen data 11a created by the information processing apparatus 10. The terminal screen data 21b stored in the storage unit 21 corresponds to the terminal screen data 11b created by the information processing apparatus 10. The screen-setting table 21c stored in the storage unit 21 corresponds to the screen-setting table 11c created by the information processing apparatus 10. The storage unit 21 is an example of a storage unit.

The screen creation unit 22 can provide a function of, when the mobile terminal 40A or the mobile terminal 40B is connected to the programmable display 20, referring to information on a device that has been set in the screen-setting table 21c so as to obtain a set value corresponding to the connected mobile terminal (hereinafter, "connected terminal") and creating screen data for the connected terminal by using the obtained set value and the terminal screen data 21b.

Figure 7:
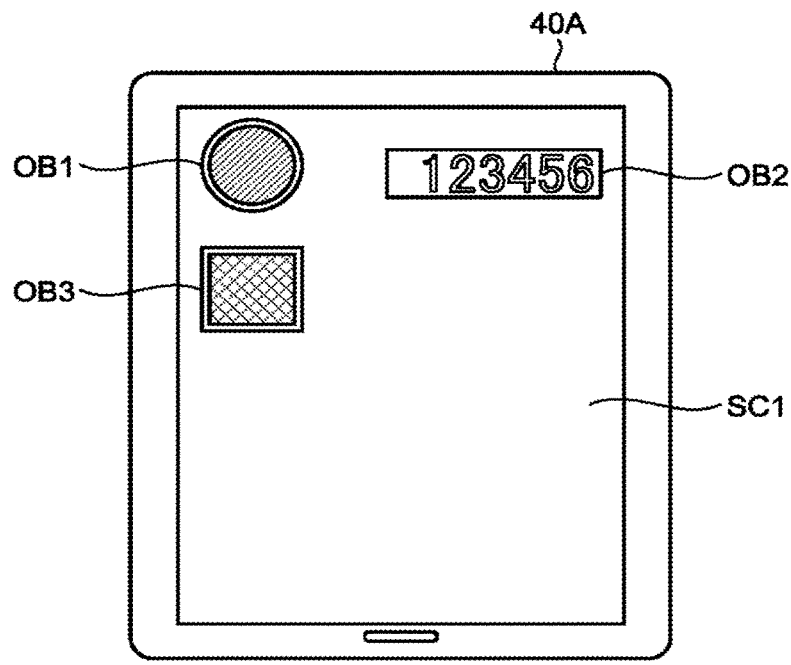
FIG. 7 is a diagram illustrating an example of a screen to be displayed on a mobile terminal according to the embodiment.
Figure 8:
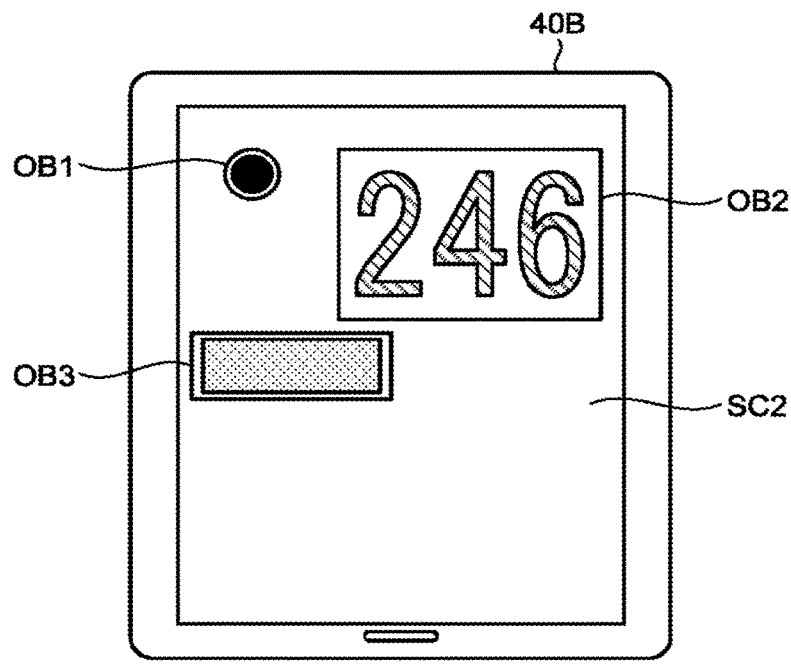
FIG. 8 is a diagram illustrating an example of a screen to be displayed on the mobile terminal according to the embodiment.

With reference to FIG. 6 to FIG. 8, screen-data creation implemented by the function provided by the screen creation unit 22 is described below. FIG. 6 is a diagram illustrating an example of device values corresponding to devices that have been set in the screen-setting table 21c according to the present embodiment. FIG. 7 and FIG. 8 are diagrams illustrating an example of a screen to be displayed on the mobile terminal according to the present embodiment.

The screen creation unit 22 obtains a terminal identifier included in a screen-data request transmitted from the connected terminal. The screen creation unit 22 refers to the screen-setting table 21c to obtain devices corresponding to the terminal identifier. The screen creation unit 22 obtains device values corresponding to the devices from the control apparatus 30. The screen creation unit 22 creates screen data for the connected terminal by using the terminal screen data 21b and the device values, and then transmits the screen data to the connected terminal.

Specifically, in the example illustrated in FIG. 6, the device value="1" is stored in the device "D100" corresponding to the terminal identifier "m001", the device value="100" is stored in the device "D200", and the device value="224" is stored in the device "D300". In a case where the connected terminal is the mobile terminal 40A (the terminal identifier="m001"), the screen creation unit 22 thus creates screen data for the mobile terminal 40A such that the object OB1 included in a screen for the mobile terminal 40A is displayed with "display size=100 and display color=red". In a similar manner, the screen creation unit 22 creates screen data such that the object OB2 is displayed with "display size=200 and display color=white" and the object OB3 is displayed with "display size=100 and display color=blue".

Furthermore, in the example illustrated in FIG. 6, the device value="1" is stored in the device "W1F0" corresponding to the terminal identifier "m002", the device value="33" is stored in the device "R0", and the device value="0" is stored in the device "D1000". In a case where the connected terminal is the mobile terminal 40B (the terminal identifier="m002"), the screen creation unit 22 thus creates screen data for the mobile terminal 40B such that the object OB1 included in a screen for the mobile terminal 40B is displayed with "display size=33 and display color=black". In a similar manner, the screen creation unit 22 creates screen data such that the object OB2 is displayed with "display size=400 and display color=pink" and the object OB3 is displayed with "display size=200 and display color=green".

The object OB1, the object OB 2, and the object OB3 that are included in a screen SC1 displayed on the mobile terminal 40A are displayed with sizes illustrated in FIG. 7, for example, on the basis of the device values that have been set in the screen-setting table 21c illustrated in FIG. 6. Furthermore, the object OB1, the object OB 2, and the object OB3 that are included in a screen SC2 displayed on the mobile terminal 40B are displayed with sizes illustrated in FIG. 8 on the basis of the device values that have been set in the screen-setting table 21c illustrated in FIG. 6. When the screen SC1 illustrated in FIG. 7 and the screen SC2 illustrated in FIG. 8 are compared with each other, the objects OB1, OB2, and OB3 on the screen displayed on the mobile terminal 40A have different sizes from the objects OB1, OB2, and OB3 on the screen displayed on the mobile terminal 40B, respectively. The screen creation unit 22 creates screen data for a connected terminal in this manner, and thereby screen display in a different display mode for each mobile terminal is accomplished. On the screen SC1 illustrated in FIG. 7 and the screen SC2 illustrated in FIG. 8, an example is illustrated in which different devices are assigned to corresponding objects and consequently the corresponding objects are displayed in different modes. However, for example, in a case where the corresponding objects are displayed in an identical mode, an identical device is assigned to these corresponding objects.

The data storage unit 23 stores the display screen data 11a, the terminal screen data 11b, and the screen-setting table 11c received from the information processing apparatus 10 in the storage unit 21 as the display screen data 21a, the terminal screen data 21b, and the screen-setting table 21c.

The communication unit 24 communicates various types of information with the information processing apparatus 10, the control apparatus 30, the mobile terminal 40A, and the mobile terminal 40B.

Figure 9:
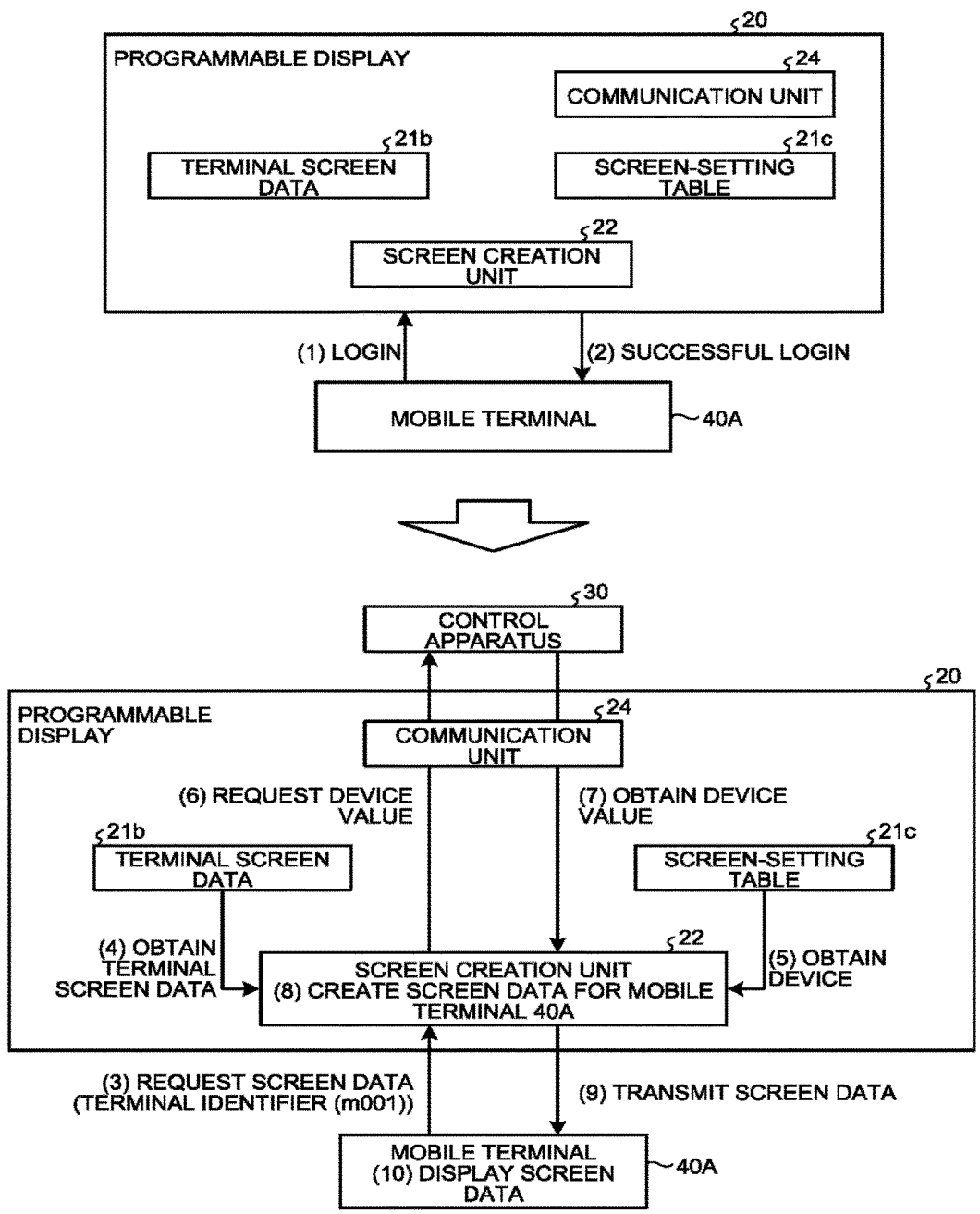
FIG. 9 is a diagram illustrating an outline of processing in the system according to the embodiment.

With reference to FIG. 9, the outline of processing in a screen display system is described below. FIG. 9 is a diagram illustrating the outline of the processing in the screen display system according to the present embodiment. The screen display system according to the present embodiment is configured to include the programmable display 20, the control apparatus 30, the mobile terminal 40A, and the mobile terminal 40B that are illustrated in FIG. 1. FIG. 9 illustrates the outline of the processing in a case where, when the mobile terminal 40A is connected to the programmable display 20, the programmable display 20 creates screen data for the mobile terminal 40A and transmits the screen data to the mobile terminal 40A.

As illustrated in FIG. 9, the mobile terminal 40A logs into the programmable display 20 (1). Upon successful login authentication of the mobile terminal 40A, the programmable display 20 responds to the mobile terminal 40A to notify the mobile terminal 40A of the successful login (2). FIG. 9 illustrates a case where login authentication is performed between the mobile terminal 40A and the programmable display 20. However, login authentication may not necessarily be performed.

After logging into the programmable display 20, the mobile terminal 40A transmits a screen-data request to the programmable display 20 (3). The screen creation unit 22 in the programmable display 20 obtains the terminal screen data 21b (4). Next, the screen creation unit 22 in the programmable display 20 refers to the screen-setting table 21c to obtain a device corresponding to the terminal identifier "m001" included in the screen-data request (5). Sequentially, the screen creation unit 22 in the programmable display 20 transmits to the control apparatus 30 a request to transmit a device value corresponding to the device (6), and obtains the device value transmitted from the control apparatus 30 (7). Next, the screen creation unit 22 in the programmable display 20 creates screen data for the mobile terminal 40A on the basis of the terminal screen data 21b and the device value (8). The screen creation unit 22 in the programmable display 20 then transmits to the mobile terminal 40A the created screen data for the mobile terminal 40A (9).

Upon reception of the screen data from the programmable display 20, the mobile terminal 40A displays a screen based on the received screen data (10).

Figure 10:
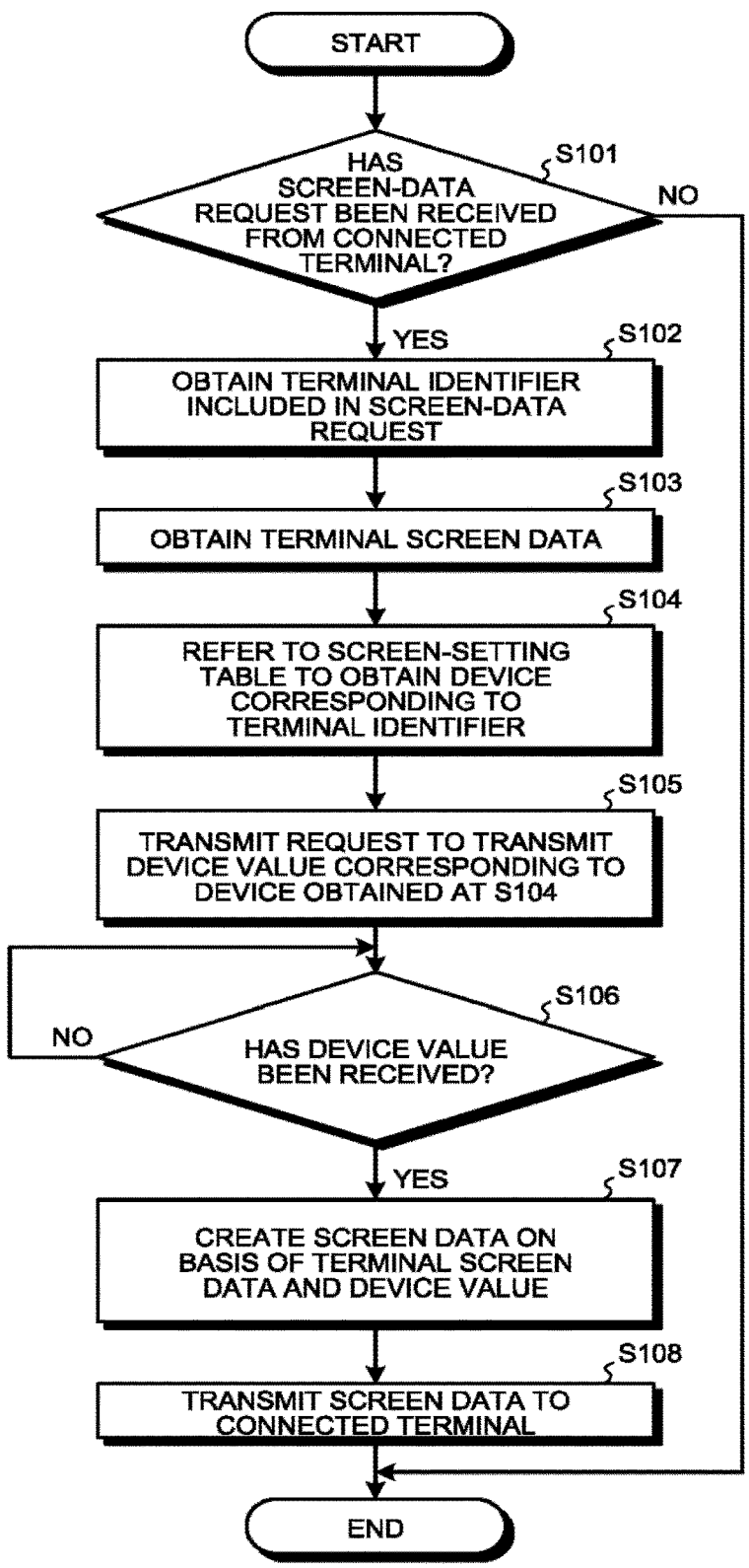
FIG. 10 is a flowchart illustrating an example of processing in the programmable display according to the embodiment.

An example of the processing executed by the programmable display 20 is described with reference to FIG. 10. FIG. 10 is a flowchart illustrating an example of the processing in the programmable display 20 according to the present embodiment.

As illustrated in FIG. 10, the programmable display 20 determines whether a screen-data request has been received from a connected terminal (Step S101).

As a result of the determination, when the programmable display 20 determines that the screen-data request has been received from the connected terminal (YES at Step S101), the programmable display 20 obtains a terminal identifier included in the screen-data request (Step S102).

Next, the programmable display 20 obtains the terminal screen data 21b (Step S103). Sequentially, the programmable display 20 refers to the screen-setting table 21c to obtain a device corresponding to the terminal identifier obtained at Step S102 (Step S104).

Next, the programmable display 20 transmits to the control apparatus 30 a request to transmit a device value corresponding to the device (Step S105), and then determines whether the device value has been received (Step S106).

As a result of the determination, when the programmable display 20 determines that the device value has not been received (NO at Step S106), the programmable display 20 repeats the above determination. In contrast to that, as a result of the determination, when the programmable display 20 determines that the device value has been received (YES at Step S106), the programmable display 20 creates screen data on the basis of the terminal screen data 21b obtained at Step S103 and the device value (Step S107).

Sequentially, the programmable display 20 transmits the screen data created at Step S107 to the connected terminal (Step S108), and then ends the processing illustrated in FIG. 10.

At Step S101 described above, as a result of the determination, when the programmable display 20 determines that the screen-data request has not been received from the connected terminal (NO at Step S101), the programmable display 20 ends the processing illustrated in FIG. 10.

The programmable display 20 may execute the processing procedure at Step S103 described above prior to the processing procedure at Step S102 described above.

At Step S106 described above, in a case where the determination result indicating that the device value has not been received is derived a predetermined number of times or where a state in which the device value has not been received is continued for a given period of time, the programmable display 20 may stop obtaining the device value and forcibly end the processing illustrated in FIG. 10. At this time, the programmable display 20 may transmit a message instructing the connected terminal to retransmit the screen-data request after a period of time or a message indicating that the screen cannot be displayed.

In the embodiment described above, the example has been described in which a device is set in association with a terminal identifier so as to change the screen configuration for each connected terminal. However, the present invention is not limited to this example. The screen configuration can also be changed for each user of the connected terminal. In this case, it suffices that a device is set in association with information uniquely assigned to a user, such as a user identifier. Alternatively, the screen configuration can be changed in accordance with the authority level assigned in advance to a user of the connected terminal. In this case, it suffices that a device is set in association with the user identifier and information on the authority level assigned in advance to this user identifier. In this manner, the programmable display 20 can identify the authority level corresponding to a user identifier logging into the programmable display 20, obtain a device value corresponding to the identified authority level, and create screen data in accordance with the authority level of the user of the connected terminal.

Figure 11:
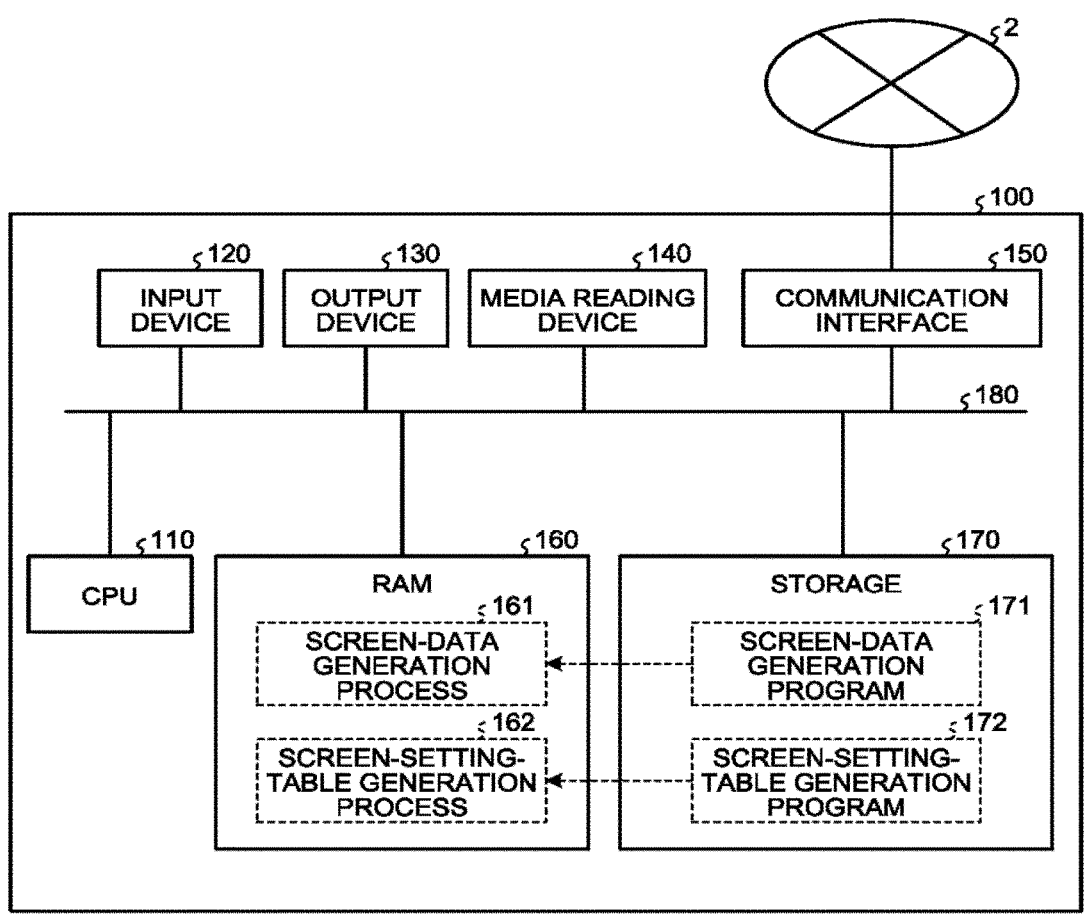
FIG. 11 is a diagram illustrating an example of a hardware configuration of the information processing apparatus according to the embodiment.

A description will be given, with reference to FIG. 11, of an example of a computer that executes a screen-data generation program and a screen-setting program that implement the processing function similar to the processing function of the information processing apparatus 10 described in the above embodiment. FIG. 11 is a diagram illustrating an example of the hardware configuration of the information processing apparatus 10 according to the present embodiment.

As illustrated in FIG. 11, a computer 100 that serves as the information processing apparatus 10 includes a Central Processing Unit (CPU) 110 that executes various computation processing. The computer 100 includes an input device 120 that accepts data input from a user, and an output device 130 that outputs various types of data.

For example, the input device 120 includes a keyboard, a mouse, and the like. The output device 130 includes a monitor, a display, or the like. In a case where the input device 120 includes a mouse, the input device 120 can achieve a pointing device function in cooperation with the monitor or the display included in the output device 130. In a case where the input device 120 includes a different input device such as a touch pad, the input device 120 can also achieve a pointing device function in a similar manner to the case of a mouse. The input device 120 and the output device 130 may be configured as an input/output device having an input/output such as a touch screen display.

As illustrated in FIG. 11, the computer 100 includes a media reading device 140 that reads a program and other data from a storage medium, and a communication interface 150 that communicates data with other computers through a network. For example, the communication interface 150 corresponds to the communication unit 14.

As illustrated in FIG. 11, the computer 100 includes a Random Access Memory (RAM) 160 that temporarily stores therein various types of information, and a storage 170. The apparatuses 110 to 170 are connected to one another by a bus 180. For example, the storage 170 corresponds to the storage unit 11.

The CPU 110 is an example of an arithmetic apparatus incorporated in the computer 100 and, for example, an electronic circuit such as a Micro Processing Unit (MPU), an Application Specific Integrated Circuit (ASIC), or a Field Programmable Gate Array (FPGA) can be used instead of the CPU 110. The RAM 160 is an example of a working memory incorporated in a computer and, for example, a semiconductor memory element such as a flash memory can be used instead of the RAM 160.

The storage 170 stores therein a screen-data generation program 171 and a screen-setting-table generation program 172 that implement the processing function similar to the processing executed by the information processing apparatus 10 according to the embodiment described above, various types of data to be used for processing of each of the programs, and the like. The screen-data generation program 171 and the screen-setting-table generation program 172 are examples of the screen-data creation supporting program that causes the information processing apparatus 10 to function as an engineering tool that creates screen data for a screen to be displayed on the mobile terminal 40A and the mobile terminal 40B that are communicatively connected to the programmable display 20.

As illustrated in FIG. 11, the CPU 110 reads the screen-data generation program 171 from the storage 170 to load the screen-data generation program 171 into the RAM 160, thereby causing the screen-data generation program 171 to function as a screen-data generation process 161. Similarly, the CPU 110 reads the screen-setting-table generation program 172 from the storage 170 to load the screen-setting-table generation program 172 into the RAM 160, thereby causing the screen-setting-table generation program 172 to function as a screen-setting-table generation process 162. The screen-data generation process 161 and the screen-setting-table generation process 162 each read various types of data stored in the storage 170 to load the data into an area in the RAM 160 assigned thereto and execute various types of processing on the basis of the loaded data.

For example, the screen-data generation process 161 corresponds to the processing to be executed by the screen-data generation unit 12 illustrated in FIG. 2. For example, the screen-setting-table generation process 162 corresponds to the processing to be executed by the table generation unit 13 illustrated in FIG. 2.

The screen-data generation program 171, the screen-setting-table generation program 172, and the like do not always need to be stored initially in the storage 170. For example, these programs and the like may be stored in advance in a "portable physical medium" such as a FD (Flexible Disk), a CD-ROM, a DVD disk, a magneto-optical disk, and an IC card to be inserted into the computer 100, and the computer 100 may read the programs from such a medium and execute the programs. Alternatively, each of the programs and the like may be divided into a plurality of program components as needed and stored in advance in "other computers (or servers)" connected to the computer 100 via a network such as a public line, the Internet, a LAN, or a WAN, and the computer 100 may download the programs from the other computers (or servers) and execute the programs. Alternatively, by managing each of the programs and the like in "another computer (or another server)", when each of the programs and the like need to be changed or updated, the computer 100 only needs to update each of the programs and the like stored in the "another computer (or another server)".

Figure 12:
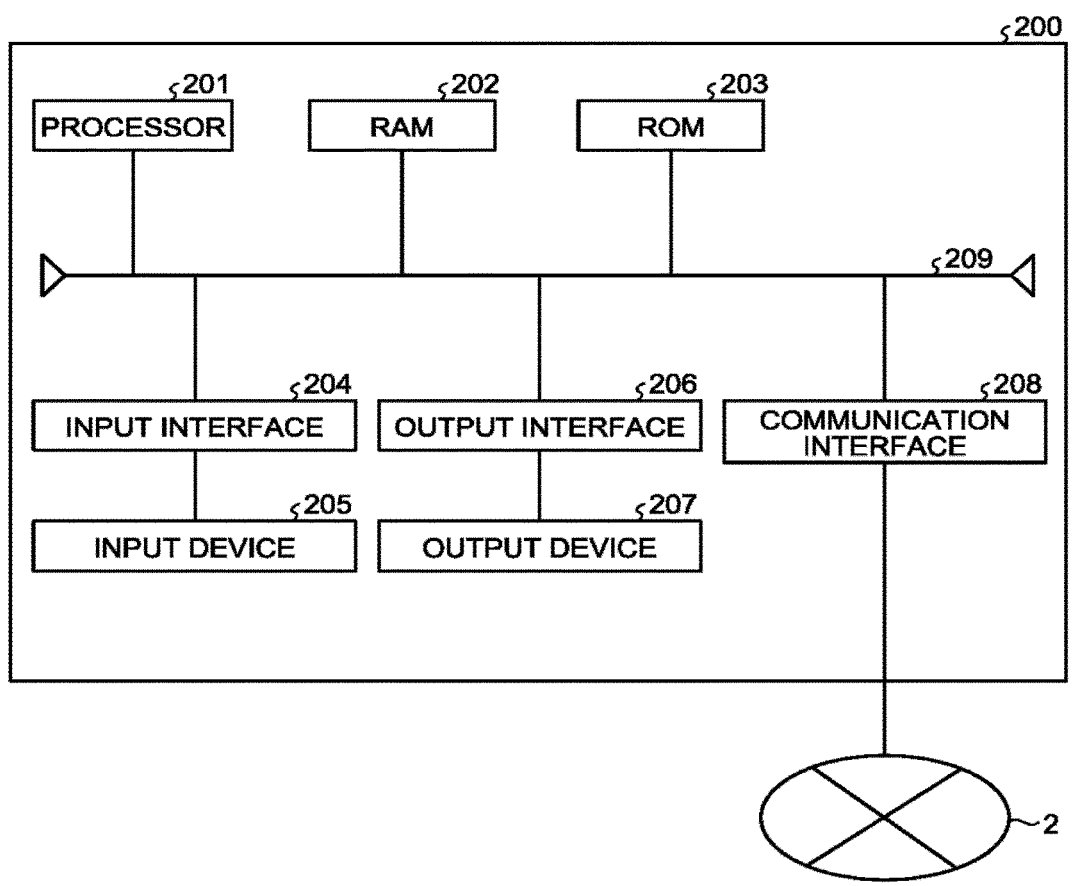
FIG. 12 is a diagram illustrating an example of a hardware configuration of the programmable display according to the embodiment.

With reference to FIG. 12, a description will be given of an example of a computer that executes various types of processing functions of the programmable display 20 described in the above embodiment. FIG. 12 is a diagram illustrating an example of the hardware configuration of the programmable display 20 according to the present embodiment.

As illustrated in FIG. 12, a computer 200 that serves as the programmable display 20 includes, for example, a processor 201, a Random Access Memory (RAM) 202, a Read Only Memory (ROM) 203, an input interface 204, an input device 205, an output interface 206, an output device 207, a communication interface 208, and a bus 209. The processor 201, the RAM 202, the ROM 203, the input interface 204, the input device 205, the output interface 206, the output device 207, and the communication interface 208 are connected to one another via the bus 209.

The RAM 202 is a readable-writable memory. For example, a semiconductor memory such as a Static RAM (SRAM) or a Dynamic RAM (DRAM) is used as the RAM 202. Instead of the RAM, a flash memory or the like can also be used. The ROM 203 stores therein a program that implements functions corresponding to the functions provided by the screen creation unit 22 and data to be used for processing in accordance with the program. The ROM 203 includes a Programmable ROM (PROM) and the like. For example, the ROM 203 corresponds to the storage unit 21. The data, to be used for processing in accordance with a program that implements functions corresponding to the functions provided by the screen creation unit 22, corresponds to the screen-setting table 21c, for example.

The input interface 204 is a circuit that transmits an input signal from the input device 205 to the processor 201. The output interface 206 is a circuit through which data is output to the output device 207 in accordance with an instruction from the processor 201. The communication interface 208 is a circuit that controls communication to be performed through the network 2. The communication interface 208 is, for example, a Network Interface Card (NIC). The input interface 204 and the output interface 206 may be integrated into a single unit. For example, the communication interface 208 corresponds to the communication unit 24.

The processor 201 reads a program stored in the ROM 203 to load the program into the RAM 202, and executes commands included in the program loaded into the RAM 202. The processor 201 operates in accordance with the result of execution of the commands included in the program so as to implement various types of processing corresponding to the functions described above provided by the screen creation unit 22. The RAM 202 may be used as a work area for the processor 201 at the time when the processor 201 executes commands.

As for a program for implementing functions corresponding to the functions provided by the screen creation unit 22 and data used for processes executed by the program, it is not always necessary to initially store them in the ROM 203. For example, each of the programs and the data may be stored in "other computers (or servers)" connected to the computer 200 via a network such as a public line, the Internet, a LAN, or a WAN, and the computer 200 may download each of the programs from the other computers (or servers) to execute the programs.

As illustrated in FIG. 12, the processor 201 reads a program stored in the ROM 203 to execute the program so as to implement the processing corresponding to the functions described above provided by the screen creation unit 22. However, the present invention is not limited to this example. Various types of processing corresponding to the functions described above provided by the screen creation unit 22 may be implemented by a wired logic in which a plurality of processing circuits for implementing various types of processing corresponding to the functions provided by the screen creation unit 22 are cooperated with each other. For example, a circuit such as an Application Specific Integrated Circuit (ASIC) or a Field Programmable Gate Array (FPGA) can be used as processing circuits corresponding to the functions provided by the screen creation unit 22.

The configurations described in the above embodiment are only examples of the content of the present invention. The configurations can be combined with other well-known technologies, and part of each of the configurations can be omitted or modified without departing from the scope of the present invention.

REFERENCE SIGNS LIST 1 system; 2 network; 10 information processing apparatus; 20 programmable display; 30 control apparatus; 40A, 40B mobile terminal; 100, 200 computer.

The invention claimed is:

1. A programmable display communicatively connected to a control apparatus that controls an apparatus in operation on a production line and to a plurality of mobile terminals, the programmable display comprising:
processing circuitry:
to execute a storing process of storing screen data used for creating a screen to be displayed on the mobile terminals and a device indicating a storage location of a device value for determining an individual configuration of the screen for each of the mobile terminals;
to execute a screen creation process of obtaining the device value on a basis of the device corresponding to a connected terminal that is the mobile terminal connected to the programmable display and creating screen data for the connected terminal by using the obtained device value and the screen data; and
to execute a communication process of transmitting to the connected terminal the screen data for the connected terminal, wherein
the screen data is data having a common constituent element used for the mobile terminals, the common constituent element being capable of being included in the screen.

2. The programmable display according to claim 1, wherein
the storing process includes storing the screen data and the device in association with a terminal identifier that uniquely identifies the mobile terminal, and
the screen creation process includes obtaining the device by using the terminal identifier corresponding to the connected terminal.

3. The programmable display according to claim 1, wherein
the storing process includes storing the screen data and the device in association with a user identifier that uniquely identifies a user of the mobile terminal, and
the screen creation process includes obtaining the device by using the user identifier of the connected terminal.

4. The programmable display according to claim 1, wherein
the storing process includes storing the screen data and the device in association with a user identifier that uniquely identifies a user of the mobile terminal and information on an authority level assigned in advance to the user, and
the screen creation process includes obtaining the device by using the user identifier of the connected terminal and the information on the authority level.

5. An information processing apparatus that creates screen data for a screen to be displayed on a plurality of mobile terminals communicatively connected to a programmable display, the information processing apparatus comprising:
processing circuitry:
to execute a screen data generation process of generating screen data used for creating a screen to be displayed on the mobile terminals;
to execute a table generation process of generating a table that includes a device indicating a storage location of a device value for determining an individual configuration of the screen for each of the mobile terminals; and
to execute a communication process of transmitting the screen data and information on the device to the programmable display, wherein
the screen data is data having a common constituent element used for the mobile terminals, the common constituent element being capable of being included in the screen.

6. A non-transitory computer-readable recording medium that stores therein screen-data creation supporting program to cause an information processing apparatus to function as an engineering tool that creates screen data for a screen to be displayed on a plurality of mobile terminals communicatively connected to a programmable display, the screen-data creation supporting program causing the information processing apparatus to execute:
generating screen data used for creating a screen to be displayed on the mobile terminals;
generating a table that includes a device indicating a storage location of a device value for determining an individual configuration of the screen for each of the mobile terminals; and
transmitting the screen data and information on the device to the programmable display, wherein
the screen data is data having a common constituent element used for the mobile terminals, the common constituent element being capable of being included in the screen.

7. A screen display system configured to include a plurality of mobile terminals, a control apparatus that controls an apparatus in operation on a production line, and a programmable display communicatively connected to the mobile terminals and the control apparatus, wherein
the programmable display includes
processing circuitry:
to execute a storing process of storing screen data used for creating a screen to be displayed on the mobile terminals and a device indicating a storage location of a device value for determining an individual configuration of the screen for each of the mobile terminals,
to execute a screen creation process of obtaining the device value on a basis of the device corresponding to a connected terminal that is the mobile terminal connected to the programmable display and creating screen data for the connected terminal by using the obtained device value and the screen data, and to execute a communication process of transmitting to the connected terminal the screen data for the connected terminal, the mobile terminal displays a screen based on screen data received from the programmable display, and the screen data is data having a common constituent element used for the mobile terminals, the common constituent element being capable of being included in the screen.

* * * * *